Figure 3:
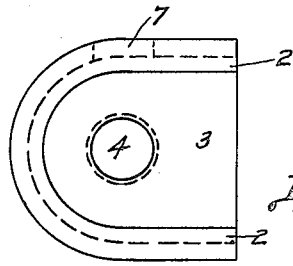

March 17, 1953     J. B. DICK ET AL     2,631,864

TAKE-UP ATTACHMENT FOR STEERING IDLER ARMS

Filed Nov. 9, 1951

INVENTORS
James B. Dick and
BY Harold Vanderburg
Chas. Henegre
Attorney.

Patented Mar. 17, 1953 2,631,864

UNITED STATES PATENT OFFICE 2,631,864

TAKE-UP ATTACHMENT FOR STEERING IDLER ARMS

James B. Dick, Birmingham, and Harold Vanderburg, Brighton, Ala.

Application November 9, 1951, Serial No. 255,622

1 Claim. (Cl. 280—95)

This invention relates to an attachment for use in taking up wear and overcoming noise in steering connections of automobiles, and especially for use on medium and low priced automobiles.

Further objects are to provide such a device that will be highly satisfactory for its purpose, simple in structure, cheap to manufacture, easy to attach, and extremely durable as it is adapted for continual adjustment as wear develops.

Other objects and advantages will appear from the drawing and description.

Figures 1, 4:
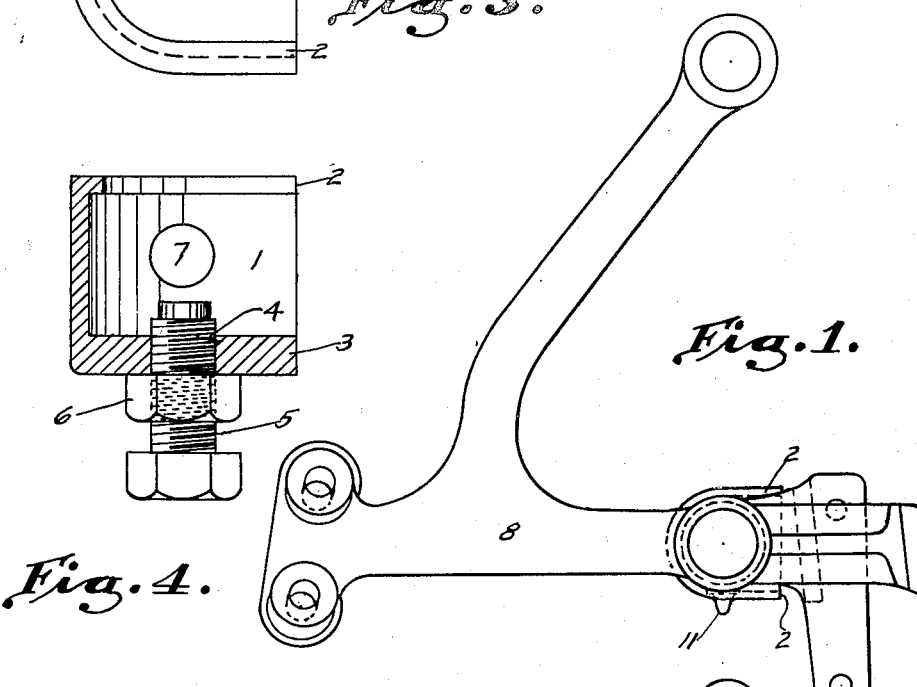
Figure 2:
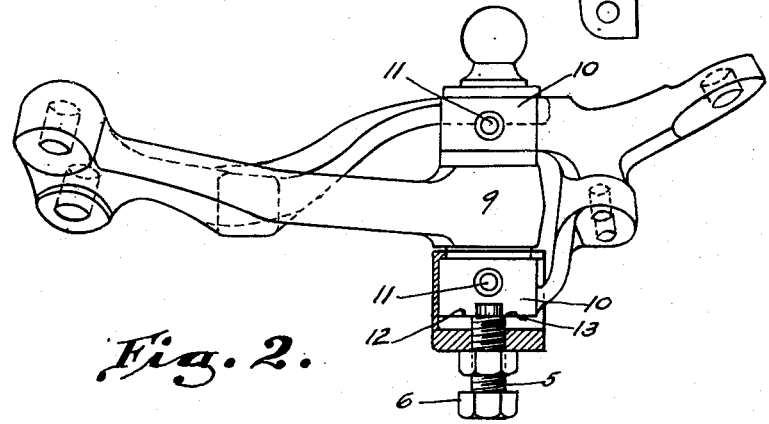

By referring generally to the drawing, a part of this application, it will be observed that Fig. 1 is a plan view of part of the steering gear of an automobile with an attachment according to the present invention mounted thereon; Fig. 2 is an edge or side view part in section and part full of Fig. 1; Fig. 3 is an enlarged plan view of the attachment; and Fig. 4 is a side view, part in section and part full, showing the assembled attachment.

Similar reference numerals refer to similar parts throughout the several views.

Referring to the drawing in detail it will be seen that the attachment comprises a main body 1 that is shaped similar to a cup with one side flat and open. The upper edge of the body is provided with an integral extending inward flange 2. The bottom 3 is thick compared to the wall and is provided with a threaded hole 4 into which a cap bolt 5 is inserted having thereon a jam nut 6. In one side of the wall there is a hole 7.

The arm 8 of the steering connection is mounted at 9 on a shaft that is supported at its ends in bearings 10 having grease injecting openings 11. The lower bearing has a closed bottom 12 into which a hole 13 is bored to provide for the inner end of the cap bolt to make contact with the lower end of the arm shaft. When the parts become worn the cap bolt is screwed inward to take up slack and the jam nut is set up tight against the under face of the attachment that is held in place for use as shown in Fig. 2 with its upper inturned flange around three quarters of the lower bearing of the arm shaft.

From the foregoing it will appear that in order to use the attachment it is first necessary to make the hole in the under face of the lower bearing of the arm shaft for the cap bolt to enter therethrough to make contact with the lower end of the arm shaft. The lower grease injecting opening is accessible through the hole in the wall of the attachment.

While we have shown and described the preferred embodiment of our invention, we do not wish to limit same to the exact and precise details of structure, but reserve the right to make all modifications and changes so long as they remain within the scope of the invention and the following claim.

Having described our invention we claim:

In combination with an automobile steering idler arm having a substantially horizontal portion and an enlarged portion at the outer end thereof, a pin extending vertically through and affixed to said enlarged portion, a bracket including a yoke having an upper and a lower leg, and a bearing for said pin formed at the outer end of each of said legs, said enlarged portion being positioned between said bearings, and a grease fitting extending laterally from each of said bearings, the provision of a hollow body comprising a horizontal base, a vertically extending wall formed integrally with said base and being U-shaped in cross sectional area, an inwardly extending flange formed integrally with the upper end portion of said wall, a bolt threadably and vertically extending through said base and having a head at the lower end thereof, and a lock nut mounted on said bolt between said base and said head, said wall having an access opening therein for said grease fitting of the lower bearing, said body adapted to encompass the lower bearing, said flange adapted to bear against the top of said lower bearing, and said bolt adapted to bear against the underside of said pin whereby to force said enlarged portion against the underside of the uppermost bearing.

JAMES B. DICK.
HAROLD VANDERBURG.

REFERENCES CITED

The following references are of record in the file of this patent:

UNITED STATES PATENTS

| Number | Name | Date |
|---|---|---|
| 1,164,522 | Hunt | Dec. 14, 1915 |
| 1,361,975 | Eichler et al. | Dec. 14, 1920 |
| 1,503,129 | Miles | July 29, 1924 |
| 1,525,274 | Day | Feb. 3, 1925 |
| 1,599,332 | Kerr | Sept. 7, 1926 |
| 1,620,084 | Dowley | Mar. 8, 1927 |